United States Patent [19]

Terry

[11] Patent Number: 4,487,008
[45] Date of Patent: Dec. 11, 1984

[54] SUPPORT

[76] Inventor: Julian W. Terry, 303 E. 16th St., Cameron, Tex. 76520

[21] Appl. No.: 425,041

[22] Filed: Sep. 24, 1982

[51] Int. Cl.³ .......................................... A01D 35/00
[52] U.S. Cl. ..................................... 56/17.2; 56/16.7
[58] Field of Search .................. 56/17.5, 17.2, 16.7, 56/15.9, 6; 172/387, 80

[56] References Cited

U.S. PATENT DOCUMENTS

| | | | |
|---|---|---|---|
| 1,961,011 | 5/1934 | Pearson | 37/144 |
| 2,302,899 | 11/1942 | Troup | 172/387 |
| 2,636,333 | 4/1953 | Michaels | 56/16.7 |
| 2,770,085 | 11/1956 | Laughlin | 56/17.5 |
| 2,777,272 | 1/1957 | Smith | 56/13.6 |
| 2,933,874 | 4/1960 | Sonmore et al. | 56/17.2 |
| 3,415,043 | 12/1968 | Shones | 56/13.6 |
| 3,564,822 | 2/1971 | Engler | 56/6 |
| 3,960,219 | 6/1976 | van der Lely | 172/387 |
| 4,125,950 | 11/1978 | Mashford | 172/387 |
| 4,195,860 | 4/1980 | Helams | 56/15.5 |
| 4,199,922 | 4/1980 | van der Lely | 56/13.6 |
| 4,233,805 | 11/1980 | van der Lely | 56/6 |
| 4,314,436 | 2/1982 | van der Lely | 56/13.6 |

Primary Examiner—Paul J. Hirsch
Attorney, Agent, or Firm—Berman, Aisenberg & Platt

[57] ABSTRACT

A skid is provided for supporting a drawn implement, such as a mower. The skid includes a convex ground-engaging disc mounted to a support for rotation about a first axis. The support is adapted to be attached to the implement for rotation about a second axis. The first and second axes are co-planar and form an acute angle.

10 Claims, 3 Drawing Figures

U.S. Patent     Dec. 11, 1984     4,487,008
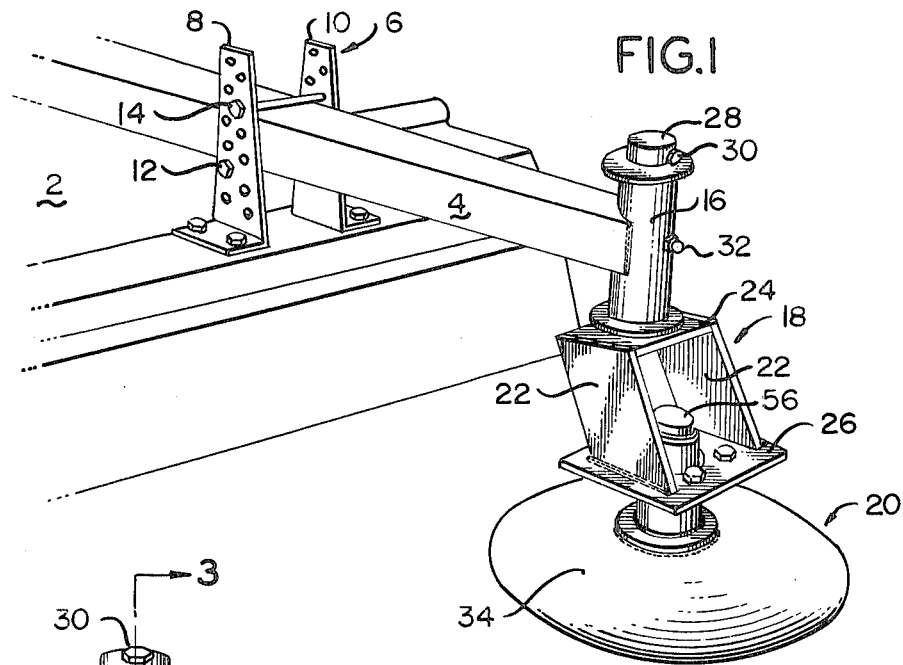
FIG.1
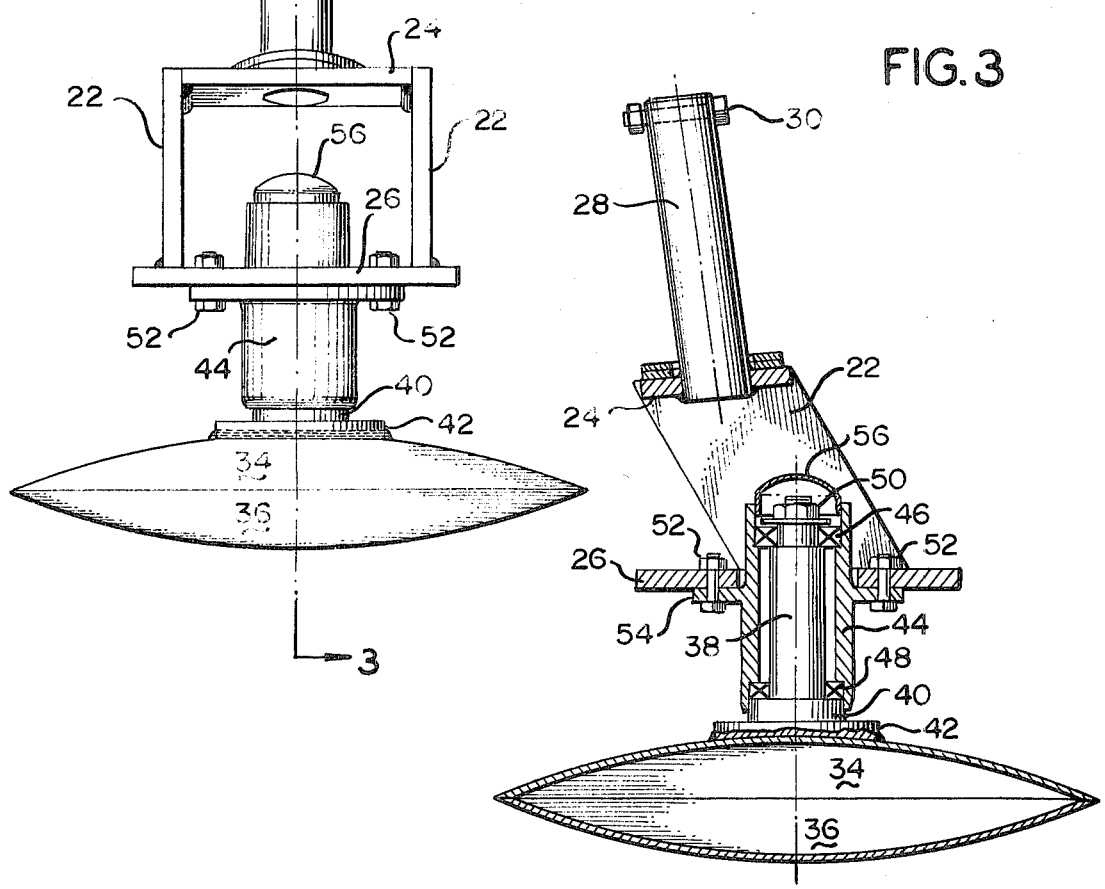
FIG.2
FIG.3

SUPPORT

TECHNICAL FIELD OF THE INVENTION

This invention relates to the field of implements which are either pushed by a vehicle or drawn.

BACKGROUND ART

A variety of implements which may be towed by a vehicle is known in the art. For example, the known rotary mower is attached to a draft vehicle by a three-point hitch, and a wheel is attached to a bar which projects rearwardly from the mower. The wheel may be of the castering type.

Other implements are known which may be pushed by a vehicle, such as a earth-moving blade. An earth-moving blade, such as that shown in the U.S. Pat. No. 1,961,011, may have pads on the bottom of the blade for supporting the weight of the blade. These pads may be circular and are typically mounted so that they do not rotate. Hence, they merely act as ground contact pads so that the edge of the blade does not dig into the ground.

It is also known to employ pads to support the blade of a mower. U.S. Pat. No. 3,415,043 shows such an apparatus. The mowing blade is mounted on a rotating shaft for vertical movement within fixed limits. Attached to the bottom of the shaft is a pad which rides along the ground and maintains the height of the cutting blade at a constant distance above the terrain. Similarly, U.S. Pat. No. 4,233,805 shows a mower having pads directly below the mowing blades to support the weight of the mower.

It is also known to use pads for supporting other implements. U.S. Pat. No. 3,960,219 shows a cultivating implement having pad-like supports. These supports are rotatable and have projections on their bottoms to induce rotation to aid in the cultivation.

STATEMENT OF THE INVENTION

The typical mower having a castering wheel for supporting the mowers suffers from several disadvantages. When used on rough terrain, the wheel is hard to control and is easily damaged. The standard rear wheel of a mower tends to follow ruts in the field being mowed thus placing undue strain on the mower and resulting in an uneven, or jerky, motion of the tractor.

The invention is a skid for replacing the rear wheel, particularly a castering wheel, in a drawn implement. The skid is convex and is mounted to a bracket for rotation about a first axis. The bracket is, in turn, mounted to the implement for rotation about a second axis. The first and second axes are co-planar, but are not parallel. This arrangement allows the combination of the bracket and the skid to caster, and also allows the skid to rotate relative to the bracket. These two degrees of freedom result in an easily controlled implement, and the skid overcomes the noted disadvantages of a wheel.

BRIEF DESCRIPTION OF THE DRAWINGS

FIG. 1 is a perspective of the skid of the invention attached to a known mower.

FIG. 2 is an elevation of the apparatus of the invention.

FIG. 3 is a cross-section of the apparatus of the invention along line 3—3 of FIG. 2.

DETAILED DESCRIPTION OF THE INVENTION

A prior art mower 2 shown in FIG. 1 has an arm 4 extending rearwardly of the mower. A support 6 comprises two plates 8 and 10 and bolts 12 and 14 located, respectively, balanced above the arm 4. The support 6, thus, grasps the arm 4, and the arm 4 supports the rear portion of the mower 2. The mower may be of a known type which is attached to a tractor by a known three-point hitch.

The end of arm 4 includes a cylindrical mounting element 16 which is known in the art for use in receiving a castering rear wheel. FIG. 1 shows the arm 4 supported by the inventive skid which includes a bracket 18 and a convex disc 20. The bracket 18 includes side plates 22, top plate 24, and bottom plate 26. A shaft 28, seen more clearly in FIGS. 2 and 3, extends from the top plate 24 and is received by the cylindrical mounting element 16. The bracket 18 is thus mounted for rotation about the axis of the cylindrical mounting element. A bolt 30 may pass through a hole in the upper end of the shaft 28 to secure the shaft in the mounting element. A grease connection 32 allows the shaft 28 to be lubricated.

Convex disc 20 comprises two convex elements 34 and 36.

The upper convex element 34 is secured to the bracket 18 for rotation with respect to the bracket.

As seen in FIGS. 2 and 3, the convex discs 34 and 36 are secured together at mating circular edges. Second shaft 38 is attached to a bearing-receiving element 40 which is attached to a mounting plate 42. The mounting plate 42 is attached to the outside surface of convex element 34, for example by welding. Shaft 38 is received in a housing 44 and is supported for rotation with respect to the housing by bearings 46 and 48. A nut 50 secures the shaft to the housing 44. The bearings 46 and 48 may be any suitable kind, and in the preferred embodiment these bearings are Timkin roller bearings. Housing 44 has a flange 54 which receives bolts 52 for securing the housing to the lower plate 26. The housing 44 may be attached to the lower plate 26 by other known means, for example as by welding. A dust cap 56 covers the end of housing 44 and prevents dust from contaminating the bearings 46 and 48.

As seen in FIG. 2, the axis of rotation of shaft 28 is co-planar with the axis of rotation of the shaft 38. As seen in FIG. 3, these axes are not parallel.

It may also be seen in FIG. 3 that the convex discs 34 and 36 are generally spherical, and their centers of curvature lie on the axis of rotation of shaft 38.

When the skid of the invention is mounted on a mower as shown in FIG. 1, the convex disc 36 engages the ground and supports the rear of the mower 2. As the tractor drawing the mower changes direction, the skid may rotate about either shaft 28 or shaft 38. Typically, the apparatus rotates about shaft 28 in a generally castering fashion, while the disc 20 rotates about shaft 38 as it slides across the field. This rotation is not continuous in a single direction, but is instead in alternate directions.

When mounted on a mower, the shaft 28 has a slightly forward inclination. The shaft 38 is then tilted rearwardly to prevent the front portion of convex disc 20 from digging into the ground and to allow the rear portion of the disc to engage the ground. The angle of inclination of the disc is preferably about 15 degrees with respect to the ground. Of course, other inclinations are useful, as will be appreciated by those of skill in the art.

It is claimed that:

1. A support for an implement comprising a convex disc, bracket means comprising mounting means for mounting said convex disc to said bracket means for rotation with respect to said bracket means about a first axis transverse to said disc and supporting means for attaching said bracket means to said implement, wherein said supporting means allows said bracket means to rotate with respect to said implement about a second axis.

2. The support of claim 1 wherein said convex disc is spherical, and the center thereof lies on said first axis.

3. The support of claim 1 or 2 wherein said first and second axes are co-planar, and are non-parallel.

4. The support of claim 3 wherein said first axis is vertical when said implement is in an operating position, and said second axis is tilted toward a direction in which said implement moves.

5. The support of claim 4 wherein said convex disc has a first convex ground-engaging portion and a second convex portion attached to said mounting means, the centers of curvature of said first and second convex portions being on said first axis.

6. The support of claim 5 wherein said means for supporting is adapted to be attached to an arm which extends rearwardly from said implement.

7. In a drawn implement, of the type which is connected to a tractor by a three-point hitch, and having a castering means for mounting a castering rear wheel, the improvement comprising a convex disc for engaging the ground, bracket means mounting said convex disc for rotation about a first axis transverse to said disc and for cooperating with said castering means for allowing said bracket means to rotate about a second axis.

8. The implement of claim 7 wherein said convex disc is spherical and the center of curvature of said disc lies on said first axis.

9. The implement of claim 8 wherein said first and second axes are co-planar and non-parallel.

10. The implement of claim 9 wherein said second axis is vertical when said implement is in an operational position, and said first axis is tilted toward said hitch.

* * * * *